(12) United States Patent
Shearer

(10) Patent No.: US 6,351,931 B1
(45) Date of Patent: Mar. 5, 2002

(54) CROP HEADER WITH DRAPER CANVAS

(75) Inventor: Bruce Robert Shearer, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 09/590,128

(22) Filed: Jun. 9, 2000

(51) Int. Cl.$^7$ .......................... A01D 34/12; A01D 34/40
(52) U.S. Cl. ...................... 56/181; 56/14.5; 56/DIG. 17
(58) Field of Search ................... 56/181, 14.5, DIG. 12, 56/14.4, 128, 179, 162, 158; 198/523

(56) References Cited

U.S. PATENT DOCUMENTS

| | | | |
|---|---|---|---|
| 923,084 A | * 5/1909 | Simmons | 56/181 |
| 1,862,101 A | * 6/1932 | Pax | 198/523 |
| 2,347,365 A | * 4/1944 | Paradise | 198/699 |
| 4,484,903 A | * 11/1984 | Schneider | 474/242 |
| 4,938,010 A | * 7/1990 | Guinn et al. | 56/181 |
| 4,956,966 A | * 9/1990 | Patterson | 56/181 |
| 5,459,986 A | 10/1995 | Talbot et al. | |
| 5,464,371 A | * 11/1995 | Honey | 460/20 |
| RE35,543 E | * 7/1997 | Patterson | 56/14.4 |
| 5,711,140 A | * 1/1998 | Bürmann | 56/208 |
| 5,926,976 A | * 7/1999 | Cretinon et al. | 36/45 |

FOREIGN PATENT DOCUMENTS

EP 0717922 * 6/1996 .......... A01D/61/00

* cited by examiner

Primary Examiner—Robert E. Pezzuto
Assistant Examiner—Árpád Fábián Kovács
(74) Attorney, Agent, or Firm—Adrian D. Battison; Michael R. Williams

(57) ABSTRACT

A header includes a generally C-shaped cutter bar supporting the sickle knife assembly across a front edge of the header. A draper assembly is carried behind the cutter bar and includes a pair of rollers at right angles to the beam carrying a continuous draper canvas band around the rollers with the front edge of the canvas underneath the cutter bar. The rollers and a support plate between the rollers for the upper run of the canvas are both recessed relative to the front edge of the canvas to leave a cantilever portion at the front edge of the canvas which projects under the cutter bar to form a seal. The position of the draper canvas on the rollers is guided by a pair of longitudinally extending ribs one adjacent but spaced rearwardly from the front edge and abutting the trailing edge of the cutter bar and the other adjacent but spaced forwardly from the rear edge and abutting a front edge of a rear plate. The ribs are formed integrally with transverse slats. The front rib forms a damming effect reducing the possibility of material sliding over the front edge of the draper. An upper surface of the front rib can be castelated to provide an increased aggressive action tending to pull the crop along the draper.

22 Claims, 3 Drawing Sheets

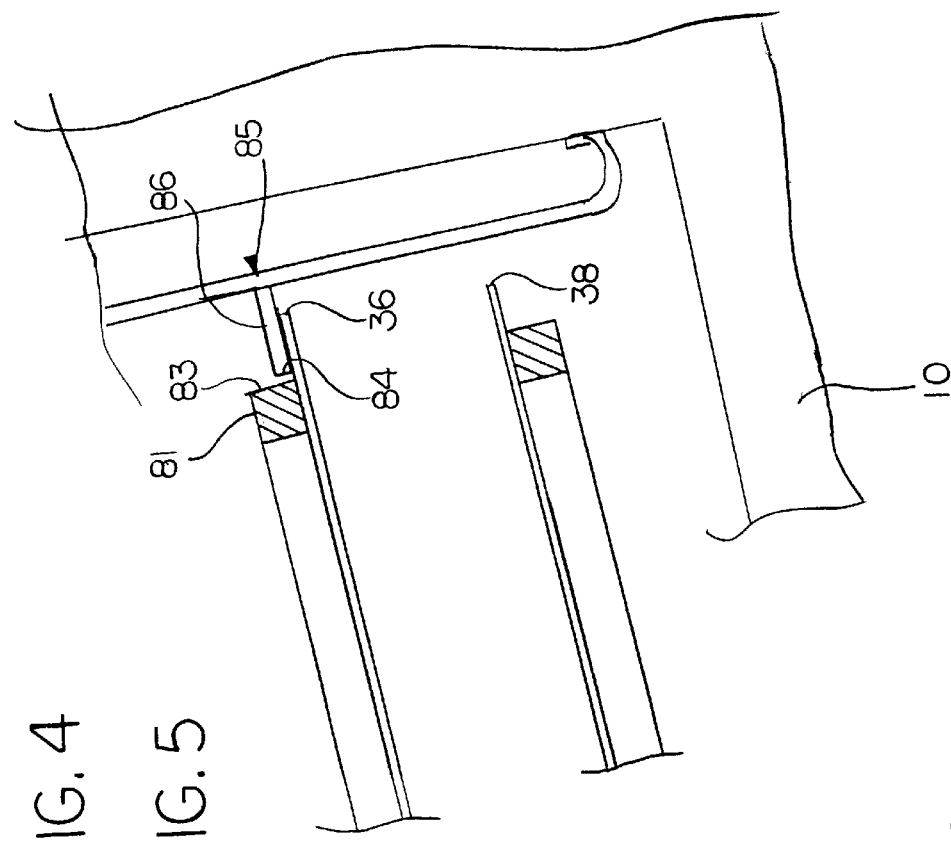
FIG. 4
FIG. 5
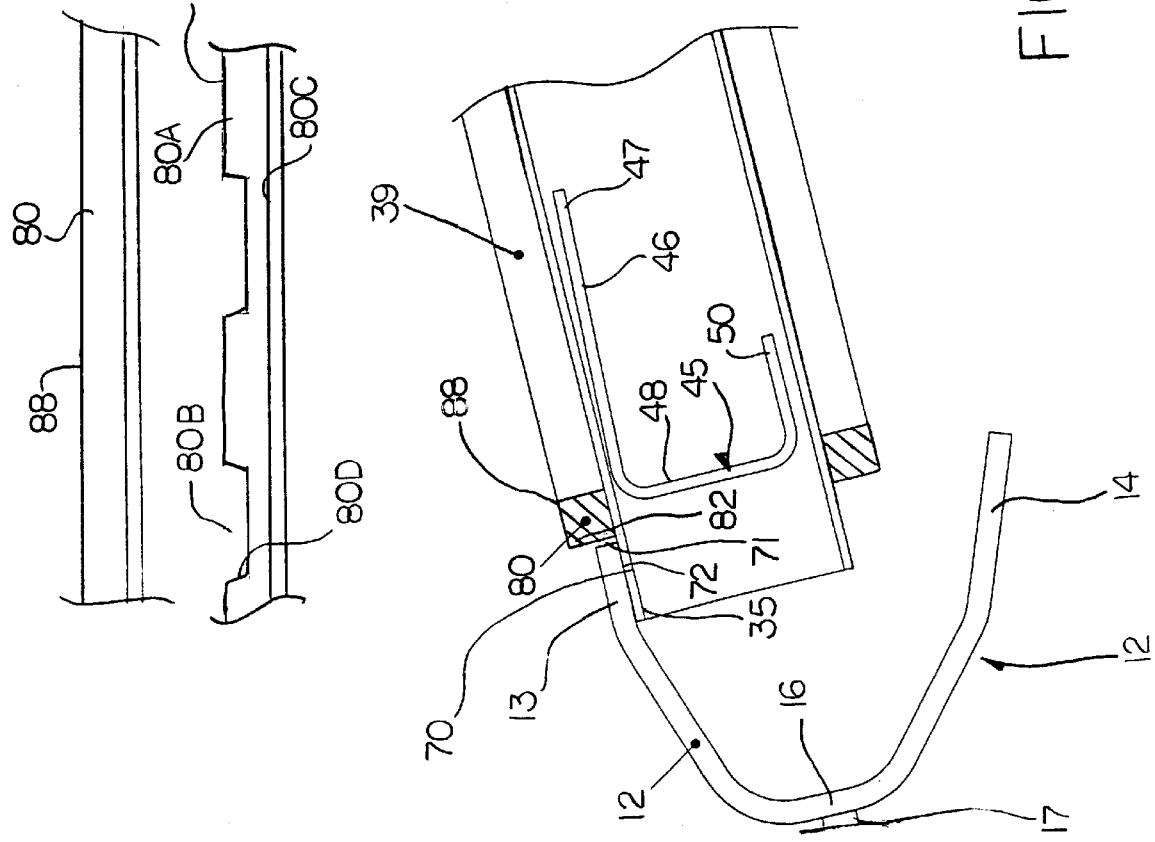
FIG. 2

CROP HEADER WITH DRAPER CANVAS

This invention relates to a header for cutting and transporting a standing crop and particularly to an arrangement which provides an improved draper canvas of the header.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper canvas forming a continuous loop of flexible material wrapped around the rollers so as to define a front edge of the canvas adjacent the cutter bar, a rear edge of the canvas spaced rearwardly of the cutter bar, an upper run of the canvas on top of the roller and a lower run of the canvas below the rollers. The cut crop thus falls rearwardly onto the upper run of the canvas and is transported longitudinally of the header. Generally, between the draper rollers there is provided a support plate assembly for the upper run of the draper canvas to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper canvas normally comprises a fabric which is coated with a rubber material which is then vulcanized after forming of the fabric into the required shape and after attachment thereto of transverse slats.

An example of a prior art draper of this type is shown in U.S. Pat. No. 5,459,986 of Talbot and Fox issued Oct. 24, 1995 to the present assignee.

One problem with a draper construction of this type is to provide and effective guiding arrangement for the draper canvas to prevent it from sliding or twisting on the rollers forwardly or rearwardly of the cutter bar. While the above patent does not show or describe the conventional guiding arrangement for the draper canvas, in practice, this guide is formed by a bead or rib formed on the underside of the canvas that is side facing inwardly which rib runs in a groove provided on the rollers.

This arrangement has been used for many years and has been considered adequate but it has a number of disadvantages examples of which are as follows.

Firstly, the rib wears rapidly. Secondly the rib is only effective at the rollers and thus has no guiding effect in the long length between the rollers. Thirdly the forces at the roller are very high due to the fact that all of the guiding effect occurs at the rollers. Fourthly, if the groove becomes contaminated, the rib can be forced out of the groove.

Another problem which has required attention is that of reducing loss of material from the carrying surface of the canvas by escaping over the front edge between the front edge and the cutter bar.

SUMMARY OF THE INVENTION

It is one object of the present invention, therefore, to provide an improved header which allows a more effective guiding of the upper run of the draper canvas.

It is a further object of the present invention, therefore, to provide an improved header which includes an improved and more effective draper canvas.

It is a yet further object of the present invention, therefore, to provide an improved header which allows a more effective co-operation between the upper run of the draper canvas and the adjacent element of the cutter bar to reduce the possibility of escape of material therebetween.

According to one aspect of the invention there is provided a header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the cutter bar including a trailing edge therealong adjacent the draper assembly;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong the draper canvas having a guide bead therealong attached to and extending outwardly from the outer surface thereof;

the guide bead being arranged such that a forward side surface of the bead on the upper surface of the upper run of the canvas, as the canvas moves in its direction of movement, runs in contact with the trailing edge of the cutter bar to guide the location of the canvas relative to the cutter bar.

The term "canvas" as used herein does not imply the use of specific material for the manufacture of the canvas since this term has become widely used as a term identifying the belts or sheets which carry the cut crop in a header of this general type.

While the knife used with the cutter bar is usually of the sickle knife type including a plurality of knife guards mounted on the cutter bar, other types of knife can also be used.

In some embodiments, the cutter bar itself comprises a channel shaped member which defines the trailing edge as an integral portion of the cutter bar itself. In other embodiments, the cutter bar forms in effect a single bar carrying the sickle knife with a separate canvas carrier element in the form of a plate attached to and carried by the cutter bar. In this latter arrangement, the trailing edge can be provided by the edge of the canvas carrier rather than the cutter bar itself. However it will be appreciated that in both arrangements the guide bead engages an edge which is fixed relative to the cutter bar and thus is guided in position relative to the cutter bar as it moves along the cutter bar.

Preferably the forward side surface of the bead is spaced rearwardly from the front edge of the canvas such that the front edge is located underneath the trailing edge of the cutter bar or canvas carrier.

Preferably there is provided a rear plate adjacent the rear edge of the upper run of the canvas, wherein the draper canvas has a second guide bead therealong attached to and extending outwardly from the outer surface thereof, the second guide bead being arranged such that a rear side surface of the second guide bead on the upper surface of the upper run of the canvas, as the canvas moves in its direction of movement, runs in contact with a front edge of the rear plate to guide the location of the canvas relative to the rear plate.

Preferably the rear side surface of the second guide bead is spaced forwardly from the rear edge of the canvas such that the rear edge is located underneath the front edge of the rear plate.

Preferably the outer surface of the canvas carries a plurality of slats thereon at spaced positions along the length of the canvas and extending at right angles to the guide bead, the slats being formed integrally with the bead so as to be connected thereto. Where the draper canvas has a second guide bead therealong attached to and extending outwardly from the outer surface thereof parallel to and spaced rearwardly from the guide bead, the slats are formed integrally with both the guide beads so as to be connected thereto.

Preferably the guide bead is continuous along the length of the canvas and has a series of cut out portions at spaced positions along the length of the canvas such that an outer surface of the guide bead is castelated to form portions of reduced height of the bead.

As the guide beads are provided on the outer surface, the inner surface of the canvas is flat and free from beads.

In the arrangement where the forward surface of the guide bead is spaced rearwardly from the front edge of the canvas, there is preferably provided a front draper support plate defining a substantially horizontal support surface lying under the upper run adjacent the front edge thereof and extending therealong between the first and second guide rollers, the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate, the trailing edge of the cutter bar extending rearwardly over the upper run of the draper canvas to a position rearwardly of the front edge of the upper run of the draper canvas and forwardly of the front end of the rollers and of the front edge of the support plate and engaging said portion of the draper canvas for forming a seal therewith to inhibit entry between the cutter bar and the draper canvas of materials carried by the cut crop.

According to a second aspect of the invention there is provided a draper canvas for a header having a cutter bar, the canvas comprising an elongate strip of flexible material for wrapping around draper guide rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon, the draper canvas having a raised rib extending therealong attached to and extending outwardly from the outer surface thereof at or adjacent the front edge thereof.

According to a third aspect of the invention there is provided a header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the cutter bar including a trailing edge therealong adjacent the draper assembly;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong the draper canvas having a raised rib therealong attached to and extending outwardly from the outer surface thereof at or adjacent the front edge.

BRIEF DESCRIPTION OF THE DRAWINGS

One embodiment of the invention will now be described in conjunction with the accompanying drawings in which:

FIG. 2 is a cross sectional view along the lines 2—2 of FIG. 1.

FIG. 4 is a front elevational view of one embodiment of the canvas only.

FIG. 5 is a front elevational view of a second embodiment of the canvas only.

In the drawings like characters of reference indicate corresponding parts in the different figures.

DETAILED DESCRIPTION

Only those parts of the header which are of importance to the present invention are shown in the above figures of the present application and the remaining parts of the header including the frame structure, drives, ground wheels and the like are omitted as these will be well known to one skilled in the art. The present invention is concerned with the area of co-operation between the front and rear edges of the draper with the cutter bar and with the rear header plate respectively and therefore these elements only are shown in detail.

Many of the figures and much of the following description is taken from the aforementioned U.S. Pat. No. 5,459,986 of the present assignees since this shows the basic construction of the header and those drawings have been modified to include the details of the present invention as described hereinafter.

The header therefore comprises a frame, one element of which is indicated at 10 in the form of a beam extending horizontally and forwardly from a rear support frame structure (not shown) to a cutter bar assembly generally indicated at 11 for support of that cutter bar assembly. The beam 10 forms one of a plurality of such beams arranged at spaced positions along the length of the header frame so as to support the cutter bar assembly 11 as an elongate structure across the front edge of the header.

Figure 1:
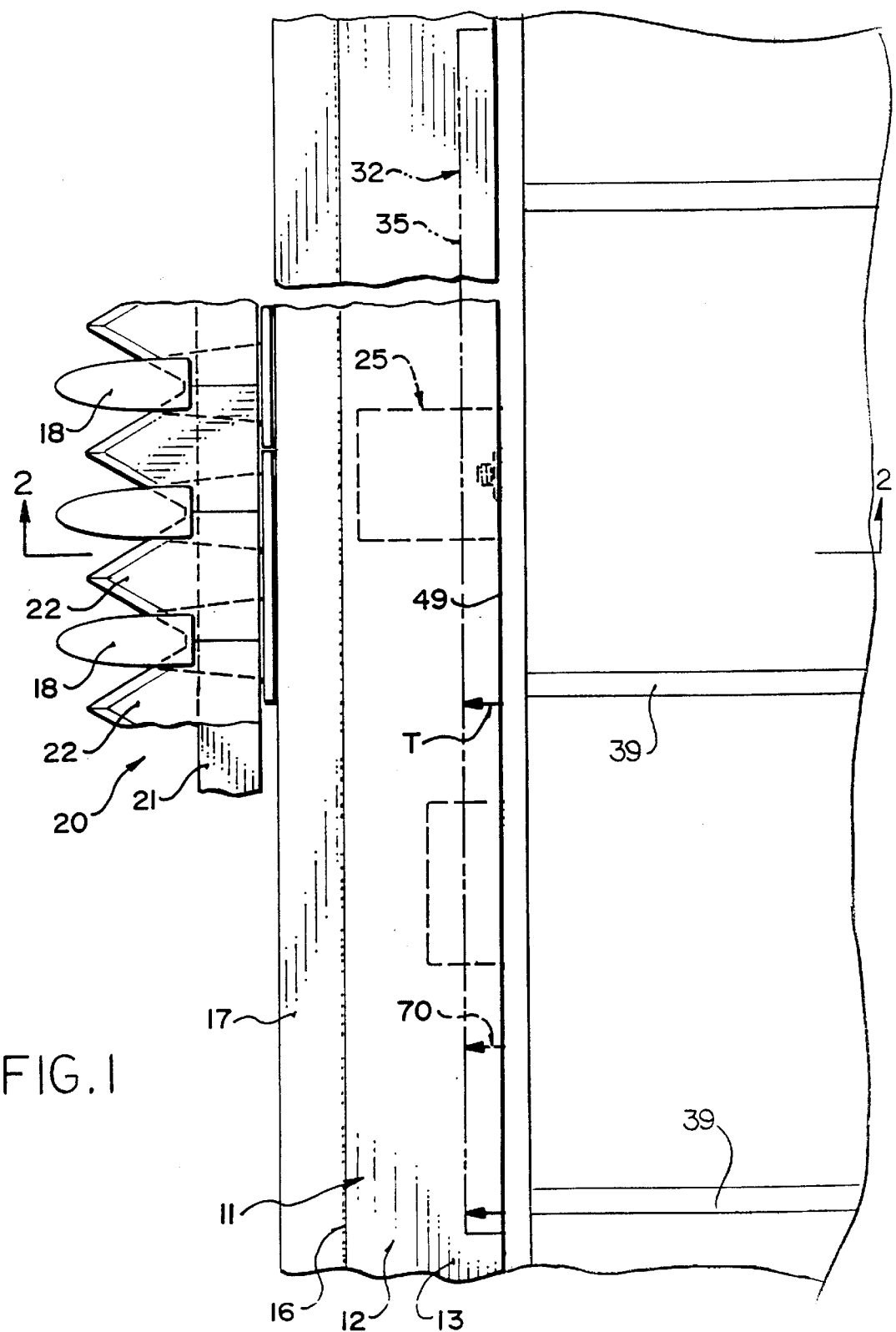
FIG. 1 is a top plan view of the front part of a header with the draper canvas removed to show the underlying elements, the position of the draper canvas being shown in dash line.
Figure 3:
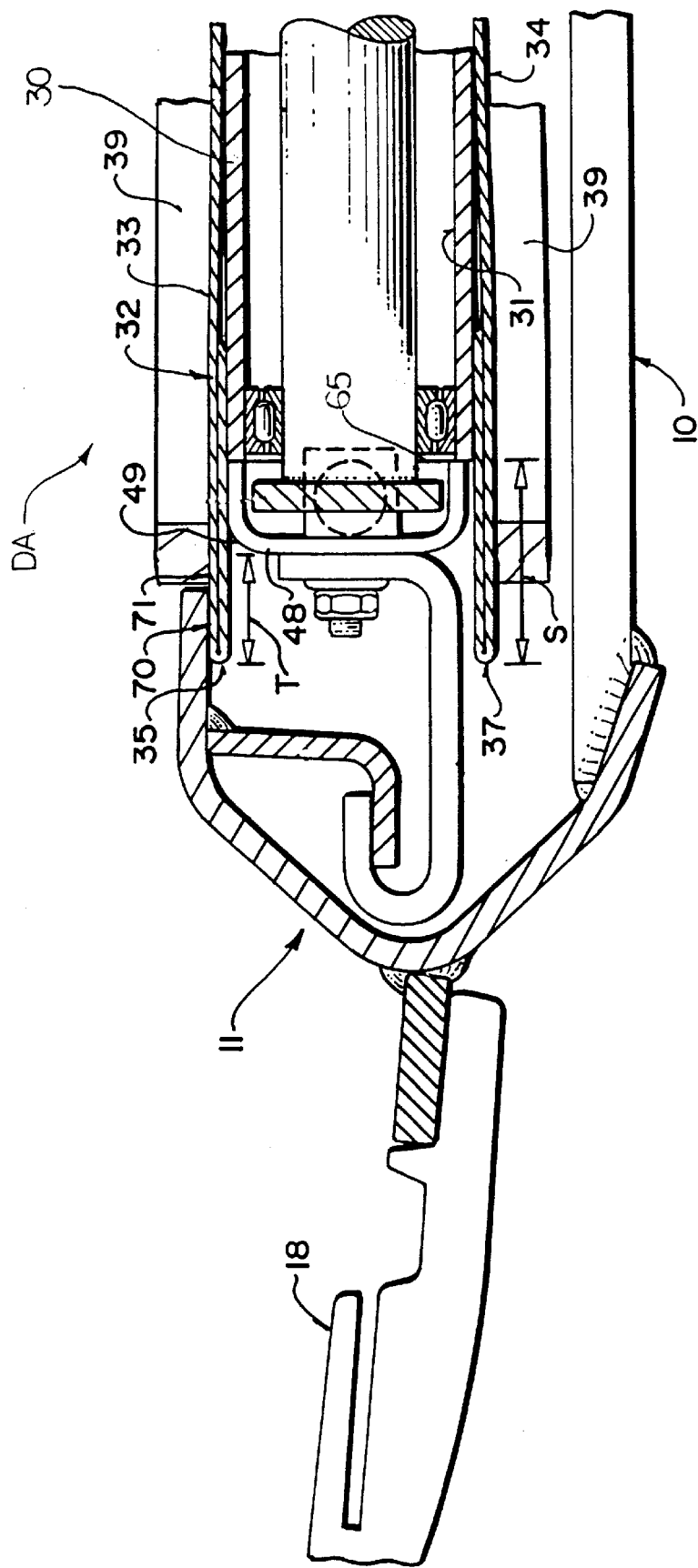
FIG. 3 is a cross sectional view similar to that of FIG. 2 showing the construction of the draper roller.

The cutter bar comprises a generally C-shaped beam 12 which provides structural support for the cutter bar with the C-shaped beam being welded to the front ends of the forwardly extending beams 10. The C-shape beam 12 includes a top plate portion 13, a bottom plate portion 14 and a forward plate portion 15 which converges from the top and bottom plate portions toward a front apex 16 forming a forward most point of the beam 12. At the apex 16 is welded a longitudinally extending bar 17 which forms a support for a plurality of knife guards 18 only some of which are shown in FIG. 1 for convenience of illustration. The knife guards are of course of well known construction and their shape is shown only schematically. The knife guards carry a sickle knife assembly 20 having a longitudinally reciprocating bar 21 driving a plurality of triangular knife blades 22 which sit on the knife guards and reciprocate back and forth across the knife guards in a cutting action. Again this construction is well known and therefore detail is not necessary.

The cutter bar support beam 12 also carries an elongate angle iron 23 which is welded onto the top plate portion 13 on the underside thereof at the front edge thereof with the angle iron extending vertically downwardly and then forming a support plate 24 extending forwardly therefrom toward the apex 16.

The draper assembly generally indicated at DA includes a first draper support roller 30 and a second draper support roller (not shown). One of these rollers is driven by a drive motor (not shown) to effect rotation of the draper in conventional manner. The draper assembly further includes a draper canvas 32 in the form of a continuous loop or band of fabric which is wrapped around the rollers at respective ends to form an upper run 33 of the draper canvas on top of the rollers and a lower run 34 of the canvas underneath the rollers. The rollers are thus spaced longitudinally of the cutter bar and arranged with their axes of rotation parallel and at right angles to the cutter bar. The draper canvas thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge 38. The draper canvas includes a plurality of conventional transverse slats 39 (omitted from FIG. 1 for convenience of illustration) which assist in carrying the crop along the draper canvas. Each edge of the draper canvas can include a conventional folded seam so as to define a portion of the canvas material which is folded back as indicated at 40 with that folded back portion being bonded to the canvas by the vulcanization effect in the manufacture of the canvas.

The upper run of the draper canvas is supported by a support plate assembly generally indicated at 45 which includes a front plate 46 and includes a center plate and rear plates which are not shown for convenience of illustration. The front plate 46 includes a horizontal top plate portion 47 lying underneath the upper run of the draper canvas adjacent the front edge for supporting that front edge in sliding movement across the top surface of that plate portion 47. The support plate 46 further includes a vertical plate portion 48 which extends downwardly from a front edge 49 of the top plate portion 47. At a bottom edge of the vertical plate portion 48 is provided a lower horizontal plate portion 50 thus forming the front support plate 46 into a generally C-shape to provide structural strength so that the support plate 46 is essentially self supporting mounted on mounting brackets (not shown).

The rollers are carried on the support plate 46. Further details of the brackets and support elements are described in the above patent.

The length of the bracket 25 is arranged so that the front edge 49 of the support plate is spaced rearwardly by a distance T from the front edge 35 of the upper run of the draper canvas. In addition the front end 65 of the rollers 30 and 31 is spaced rearwardly from the front edge 35 of the upper run of the canvas by a distance S which is greater than the distance T. This recessing of the front edges of the support plate member and of the rollers provides a portion 70 of the front edge of the draper canvas which is cantilevered outwardly beyond the support provided by those elements.

The beam 12 of the cutter bar is shaped so that the top plate portion 13 extends rearwardly to a rear edge 71 which overlaps the portion 70. The rear edge 71 is located therefore at a position rearwardly of the front edge 35 of the draper canvas and in a position forwardly of the front edge 49 of the support plate and the front ends 65 of the draper rollers. That portion of the draper canvas therefore which engages the underside 72 of the top plate portion 13 is unsupported on its underside and is therefore free to flex downwardly should it be depressed downwardly by the presence of material collecting on the under surface 72. The top plate portion 13 of the beam 12 is substantially horizontal that is parallel to the generally horizontal surface of the upper run. The cooperation therefore between the surface 72 of the upper plate portion 13 and the upper surface of the draper canvas at the portion 70 provides a seal which inhibits the tendency of materials to pass between the draper canvas and the cutter bar. This seal therefore inhibits the build-up of materials inside the C-shape of the cutter bar and between the draper canvas upper run and lower run and around the draper rollers which can of course cause damage.

In the conventional arrangement shown in the above patent, although not shown in the patent, the draper canvas is guided on the draper roller by a pair of V grooves in the roller into which projects from the back of the canvas a V-shaped guide rib which runs along the inner surface of the canvas along its full length. Normally the canvas is guided at each end of the roller by a separate rib.

The present invention provides a modified driving arrangement in which there is formed on the outside surface of the draper canvas a rib 80 which is rectangular in cross section and extends along the full length of the canvas so as to form a portion projecting upwardly from the upper surface of the upper run and projecting downwardly from the bottom surface of the lower run. A second guide rib 81 is provided adjacent the rear edge 36 of the canvas. The rib 80 is formed with a front surface 82 which is at right angles to the canvas and extends along the canvas. The front surface is thus flat and is arranged adjacent to the rear or trailing edge 71 of the cutter bar. Similarly the rib 81 includes a rear surface 83 which again is flat and at right angles to the canvas so that it abuts a front edge 84 of a rear plate assembly 85.

As previously explained, the front surface of the rib is spaced rearwardly from the front edge of the canvas so that the front portion of the canvas underlies the trailing edge of the cutter bar. Similarly the rear plate assembly 85 includes a forwardly projecting flange portion 86 which overlies the rear edge 36 of the upper run of the belt and butts against the surface 83.

The rear plate assembly 85 forms a rear sheet across the width of the header and that rear sheet is fastened over the frame members 10 by a suitable fastening arrangements (not shown). The flange 86 projects forwardly from that rear sheet and lies in the same plane as the canvas.

The ribs 80 and 81 are shown as of square cross section but it will be appreciated that the facing edge 82 and 83 forms the important edge of the structure so that the remaining surfaces may be of any required shape without affecting the operation. The ribs 80 and 81 have a height greater than the thickness of the abutting plate and preferably lying in the range 0.5 to 1.0 inch.

The spacing between the surfaces 82 and 83 is arranged to be slightly less than the spacing between the abutting edges 71 and 84 so that there is no possibility of jamming of the canvas. However front to rear movement of the canvas is prevented by the surfaces of the ribs abutting one or other of the surfaces of the plates. Thus the forward and rearward movement of the canvas is limited to the slight clearance defined by the difference in the widths above.

The rib 80 at the front of the canvas also assists in providing an improved seal since it stands upwardly from the cutter bar and provides a narrow gap or lies in abutment with the cutter bar so as to further inhibit the penetration of materials between the draper canvas and the cutter bar.

The presence of the rib 80 at the front of the canvas also assists in retaining on the canvas any crop materials including seeds which may tend to roll forwardly on the forwardly inclined canvas and thus be lost over the front of the cutter bar or between the cutter bar and the canvas. Thus the rib acts as a dam tending to retain materials on the canvas so that they are carried with the canvas to the discharge location of the header where they can be collected.

The ribs 80 and 81 are formed integrally with the slats 39, that is the ribs are formed of a strip of rubber or reinforced rubber material which is applied onto the canvas surface and attached in place using a vulcanization process so that the ribs and the slats are applied simultaneously and thus formed so that the slats interconnect with the inside surface of the ribs as an integral structure. Thus the slats preferably have a height which is common with the height of the ribs.

As shown in FIG. 4, one embodiment of the rib has a constant height along its full length so that the top surface 88 of the rib is flat and parallel to the top surface of the draper. This shape is convenient in that it utilizes the same strip material which is utilized for the slats which are similarly shaped.

In the embodiment of FIG. 5, however, there is provided a modified arrangement in which the rib indicated at 80A has a plurality of cut-out portions 80B so that the top surface 88A is castelated. In the embodiment shown the cut-out portions 80B extend over approximately half of the height of the rib so that there remains a rib portion raised from the top surface 80C of the canvas itself. However in other embodiments, the rib may be cut down at each cut out portion so that its height is equal to the top of the canvas sheet so that the rib is thus formed in separate pieces as opposed to the continuous arrangement shown in FIGS. 4 and 5. This arrangement is disadvantageous in that it no longer provides the damming effect. However the cut-out portions 80B either of full height or of partial height as shown assist in allowing the structure to bend around the rollers where stretching of the rib is necessary to accommodate the differences in diameter. The cut-out portions further provide an aggressive action on the crop where the shoulders 80D between each cut out portion and the next adjacent raised or full height portion engage the crop to assist in carrying the crop longitudinally of the draper canvas to the collection point.

While an important aspect of the guide bead or rib at or adjacent the front edge of the canvas is that it contacts and runs along an edge of the cutter bar or fixed relative to the cutter bar, the guiding may be provided by another element or may be provided by a contact of the edge of the canvas with a suitable surface on the cutter bar and the rib or bead act merely as a dam or barrier to assist in preventing the escape of material at the front edge of the canvas. Thus the rib acts to improve the seal between the canvas and the cutter bar and this aspect of its operation is important and can be adopted without necessarily using the guiding aspect.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong;

the cutter bar including a rearwardly facing trailing edge therealong at the upper run of the draper canvas;

the draper canvas having a front guide bead extending longitudinally therealong attached to and extending outwardly from the outer surface thereof;

the front guide bead being located rearwardly of the trailing edge of the cutter bar with a forward side surface of the front guide bead on the upper surface of the upper run of the canvas in contact with the rearwardly facing trailing edge of the cutter bar.

2. The header according to claim 1 wherein there is provided a rear plate adjacent the rear edge of the upper run of the canvas, wherein the draper canvas has a rear guide bead therealong attached to and extending outwardly from the outer surface thereof, the rear guide bead being located with a rear side surface of the rear guide bead on the upper surface of the upper run of the canvas in contact with a forwardly facing front edge of the rear plate.

3. The header according to claim 2 wherein the rear side surface of the rear guide bead is spaced forwardly from the rear edge of the canvas with the rear edge located rearwardly of and underneath the forwardly facing front edge of the rear plate.

4. The header according to claim 1 wherein the outer surface of the canvas carries a plurality of slats thereon at spaced positions along the length of the canvas and extending at right angles to the front guide bead, the slats being formed integrally with the front guide bead so as to be directly connected thereto.

5. The header according to claim 1 wherein the draper canvas has a rear guide bead therealong attached to and extending outwardly from the outer surface thereof parallel to and spaced rearwardly from the front guide bead and wherein the outer surface of the canvas carries a plurality of slats thereon at spaced positions along the length of the canvas and extending between and at right angles to the front and rear guide beads, the slats being formed integrally with the front and rear guide beads so as to be directly connected thereto.

6. The header according to claim 1 wherein the draper canvas has a rear guide bead therealong attached to and extending outwardly from the outer surface thereof with the rear guide bead parallel to and spaced rearwardly from said front guide bead, said front guide bead being spaced rearwardly from the front edge of the canvas and the rear guide bead being spaced forwardly from the rear edge of the canvas.

7. The header according to claim 1 wherein the front guide bead is continuous along the length of the canvas.

8. The header according to claim 1 wherein the front guide bead has a series of cut out portions at spaced positions along the length of the canvas such that an outer surface of the front guide bead is castelated.

9. The header according to claim 8 wherein the front guide bead is continuous along the length of the canvas and the cut out portions form portions of reduced height of the front guide bead.

10. The header according to claim 1 wherein the inner surface of the canvas is flat.

11. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong;

the cutter bar including a rearwardly facing trailing edge therealong at the upper run of the draper canvas;

the draper canvas having a front guide bead extending longitudinally therealong attached to and extending outwardly from the outer surface thereof;

the front guide bead being located rearwardly of the trailing edge of the cutter bar with a forward side surface of the front guide bead on the upper surface of the upper run of the canvas in contact with the rearwardly facing trailing edge of the cutter bar;

and the front guide bead being located at a position spaced rearwardly from the front edge of the canvas with the front edge of the upper run of the canvas located forwardly of and underneath the rearwardly facing trailing edge of the cutter bar.

12. The header according to claim 11 wherein there is provided a front draper support plate defining a substantially horizontal support surface lying under the upper run adjacent the front edge thereof and extending therealong between the first and second guide rollers, the first and second guide rollers each having a front end thereof recessed rearwardly of the front edge of the upper run of the draper canvas and the support plate having a front edge thereof recessed rearwardly of the front edge of the upper run of the draper canvas such that the upper run of the draper canvas includes a portion thereof at the front edge which is cantilevered forwardly of the rollers and of the support plate, the trailing edge of the cutter bar extending rearwardly over the upper run of the draper canvas to a position rearwardly of the front edge of the upper run of the draper canvas and forwardly of the front end of the rollers and of the front edge of the support plate and engaging said portion of the draper canvas for forming a seal therewith to inhibit entry between the cutter bar and the draper canvas of materials carried by the cut crop.

13. A draper canvas for a header having a cutter bar, the canvas comprising an elongate strip of flexible material for wrapping around draper guide rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon, the draper canvas having a raised front rib extending longitudinally therealong attached to and extending outwardly from the outer surface thereof at a position thereon adjacent to but spaced rearwardly from the front edge such that an upstanding front side surface of the raised front rib is spaced rearwardly from the front edge of the canvas.

14. The canvas according to claim 13 wherein the draper canvas has a rear raised rib therealong attached to and extending outwardly from the outer surface thereof, the rear raised rib being arranged at or adjacent the rear edge of the canvas.

15. The canvas according to claim 14 wherein the rear side surface of the rear raised rib is spaced forwardly from the rear edge of the canvas.

16. The canvas according to claim 13 wherein there is provided a rear raised rib therealong attached to and extending outwardly from the outer surface thereof parallel to and spaced rearwardly from the front raised rib and wherein the outer surface of the canvas carries a plurality of slats thereon at spaced positions along the length of the canvas and extending between and at right angles to the front and rear raised ribs, the slats being formed integrally with the front and rear raised ribs so as to be directly connected thereto.

17. The canvas according to claim 13 wherein the front raised rib is continuous along the length of the canvas.

18. The canvas according to claim 13 wherein the front raised rib has a series of cut out portions at spaced positions along the length of the canvas such that an outer surface of the front raised rib is castelated.

19. A draper canvas for a header having a cutter bar, the canvas comprising an elongate strip of flexible material for wrapping around draper guide rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon, the draper canvas having a raised front rib extending longitudinally therealong attached to and extending outwardly from the outer surface thereof at a position thereon at or adjacent to the front edge, the outer surface carrying a plurality of slats thereon at spaced positions along the length of the canvas and extending at right angles to the front raised rib, the slats being formed integrally with the front raised rib so as to be directly connected thereto.

20. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the cutter bar including a trailing edge therealong adjacent the draper assembly;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong the draper canvas having a front raised rib extending longitudinally therealong attached to and extending outwardly from the outer surface thereof at a position thereon adjacent to but spaced rearwardly from the front edge.

21. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that crop cut by the knife of the cutter bar falls onto the draper assembly for transportation longitudinally of the header;

the cutter bar including a trailing edge therealong adjacent the draper assembly;

the draper assembly including:

a first and a second draper guide roller each arranged at a respective end of the draper assembly spaced apart along the cutter bar with an axis of each guide roller arranged substantially at right angles to the cutter bar;

a draper canvas forming a continuous loop of flexible material wrapped around the rollers so as to define an upper run of the canvas on top of the rollers and a lower run of the canvas below the rollers, a front edge of the upper run of the canvas adjacent the cutter bar, a rear edge of the upper run of the canvas spaced rearwardly of the cutter bar, an inner surface of the canvas facing inwardly and an outer surface of the canvas facing outwardly such that the outer surface defines an upper surface of the upper run for carrying the cut crop thereon;

at least one of the guide rollers being arranged to effect driving of the canvas in a direction along its length to carry the cut crop therealong;

the draper canvas having a raised front rib extending longitudinally therealong attached to and extending outwardly from the outer surface thereof;

the outer surface of the canvas having a plurality of slats thereon at spaced positions along the length of the canvas and extending at right angles to the raised front rib;

the slats being formed integrally with the raised front rib so as to be directly connected thereto.

22. The header according to claim 21 wherein the draper canvas has a raised rear rib therealong attached to and extending outwardly from the outer surface thereof parallel to and spaced rearwardly from the raised front rib and wherein the slats are formed integrally with the raised rear rib so as to be directly connected to both the raised front rib and the raised rear rib.

* * * * *